(12) United States Patent
Chung et al.

(10) Patent No.: US 10,554,736 B2
(45) Date of Patent: *Feb. 4, 2020

(54) MOBILE URL CATEGORIZATION

(71) Applicant: Palo Alto Networks, Inc., Santa Clara, CA (US)

(72) Inventors: Seokkyung Chung, San Jose, CA (US); Farshad Rostamabadi, Los Gatos, CA (US); William Redington Hewlett, II, Mountain View, CA (US); Zhi Xu, Cupertino, CA (US); Shadi Rostami-Hesarsorkh, Los Altos, CA (US); Lin Xu, Saratoga, CA (US); Lee Klarich, Los Gatos, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/107,564

(22) Filed: Aug. 21, 2018

(65) Prior Publication Data

US 2019/0014169 A1   Jan. 10, 2019

Related U.S. Application Data

(63) Continuation of application No. 14/503,374, filed on Sep. 30, 2014, now Pat. No. 10,079,876.

(51) Int. Cl.
| | |
|---|---|
| *H04L 29/08* | (2006.01) |
| *H04W 4/60* | (2018.01) |
| *H04L 29/06* | (2006.01) |
| *G06F 17/30* | (2006.01) |

(Continued)

(52) U.S. Cl.
CPC ............ *H04L 67/10* (2013.01); *H04L 63/102* (2013.01); *H04W 4/60* (2018.02); *G06F 16/285* (2019.01); *G06F 21/51* (2013.01); *H04L 63/1433* (2013.01)

(58) Field of Classification Search
CPC . H04L 63/102; H04L 63/1433; H04L 51/046; H04L 63/14; H04L 63/142; H04L 63/0227; H04L 63/20; H04L 67/02; H04L 67/10; H04L 67/22; G06F 21/554; G06F 16/285; G06F 16/35; G06F 16/51; G06N 20/00; H04W 12/0027; H04W 12/08; H04W 4/21; H04W 4/60
See application file for complete search history.

(56) References Cited

U.S. PATENT DOCUMENTS

| | | |
|---|---|---|
| 7,213,069 B2 | 5/2007 | Anderson |
| 8,108,404 B2 | 1/2012 | Sylthe |
| 8,131,271 B2 | 3/2012 | Ramer |

(Continued)

FOREIGN PATENT DOCUMENTS

| | | |
|---|---|---|
| CN | 103176900 B | 1/2016 |
| EP | 1388091 A2 | 2/2004 |

(Continued)

*Primary Examiner* — Philip J Chea
*Assistant Examiner* — Ruth Solomon
(74) *Attorney, Agent, or Firm* — Van Pelt, Yi & James LLP

(57) ABSTRACT

Techniques for categorizing mobile uniform resource locators (URLs) that are used by mobile applications are disclosed. A URL is extracted from a mobile application. A category for the URL is determined based on a categorization of the mobile application. The URL and its determined category are then generated as output.

20 Claims, 5 Drawing Sheets

(51) Int. Cl.
*G06F 21/51* (2013.01)
*G06F 16/28* (2019.01)

(56) References Cited

U.S. PATENT DOCUMENTS

| | | | |
|---|---|---|---|
| 8,190,611 B1 | 5/2012 | Nachenberg | |
| 8,578,443 B2 * | 11/2013 | Narain | H04W 12/08 |
| | | | 726/1 |
| 8,769,524 B2 | 7/2014 | Bhullar | |
| 8,805,339 B2 | 8/2014 | Ramer | |
| 8,819,772 B2 * | 8/2014 | Bettini | H04L 63/0245 |
| | | | 709/219 |
| 8,839,266 B1 | 9/2014 | Partridge | |
| 8,843,153 B2 | 9/2014 | Luna | |
| 8,949,370 B1 | 2/2015 | Wu | |
| 9,003,393 B2 | 4/2015 | Bhullar | |
| 9,027,140 B1 | 5/2015 | Watkins | |
| 9,058,490 B1 | 6/2015 | Barker | |
| 9,143,522 B2 | 9/2015 | Wang | |
| 9,152,694 B1 | 10/2015 | Padidar | |
| 9,178,852 B2 * | 11/2015 | Bettini | H04L 63/0245 |
| 9,203,864 B2 | 12/2015 | Luna | |
| 9,246,938 B2 | 1/2016 | Alme | |
| 9,247,386 B2 | 1/2016 | Kau | |
| 9,294,500 B2 * | 3/2016 | Mahaffey | G06F 21/564 |
| 9,311,386 B1 | 4/2016 | Song | |
| 9,374,386 B2 | 6/2016 | Watkins | |
| 9,378,465 B2 * | 6/2016 | Stewart | G06N 99/005 |
| 9,418,126 B2 * | 8/2016 | Shaik | G06Q 30/0201 |
| 9,419,989 B2 | 8/2016 | Harris | |
| 9,426,209 B2 | 8/2016 | Marar | |
| 9,529,927 B2 | 12/2016 | Gang | |
| 9,756,094 B1 | 9/2017 | Lewis | |
| 9,806,942 B2 * | 10/2017 | Saxena | H04W 4/50 |
| 10,284,570 B2 * | 5/2019 | Schmidtler | H04L 63/1425 |
| 2003/0110168 A1 | 6/2003 | Kester | |
| 2008/0040389 A1 | 2/2008 | Seth | |
| 2009/0089278 A1 | 4/2009 | Poola | |
| 2009/0240684 A1 | 9/2009 | Newell | |
| 2011/0191849 A1 | 8/2011 | Jayaraman | |
| 2012/0311659 A1 * | 12/2012 | Narain | G06F 21/629 |
| | | | 726/1 |
| 2012/0324568 A1 * | 12/2012 | Wyatt | G06F 21/51 |
| | | | 726/13 |
| 2013/0097706 A1 * | 4/2013 | Titonis | G06F 21/56 |
| | | | 726/24 |
| 2013/0183951 A1 * | 7/2013 | Chien | H04W 4/50 |
| | | | 455/418 |
| 2014/0006517 A1 | 1/2014 | Hsiao | |
| 2014/0040017 A1 | 2/2014 | Rahul | |
| 2014/0096024 A1 | 4/2014 | Laurent | |
| 2014/0129733 A1 | 5/2014 | Klais | |
| 2014/0310770 A1 * | 10/2014 | Mahaffey | G06F 21/564 |
| | | | 726/1 |
| 2014/0324741 A1 * | 10/2014 | Stewart | G06N 99/005 |
| | | | 706/12 |
| 2014/0331281 A1 * | 11/2014 | Bettini | H04L 63/0245 |
| | | | 726/1 |
| 2014/0342691 A1 * | 11/2014 | Kalavade | G06Q 10/0637 |
| | | | 455/405 |
| 2015/0033341 A1 * | 1/2015 | Schmidtler | H04L 63/1425 |
| | | | 726/23 |
| 2015/0067853 A1 | 3/2015 | Amrutkar | |
| 2015/0081617 A1 * | 3/2015 | Shaik | G06Q 30/0201 |
| | | | 707/602 |
| 2015/0156061 A1 * | 6/2015 | Saxena | H04W 4/50 |
| | | | 715/733 |
| 2015/0161282 A1 | 6/2015 | Low | |
| 2015/0302182 A1 * | 10/2015 | Wyatt | G06F 21/564 |
| | | | 726/26 |
| 2015/0356451 A1 | 12/2015 | Gupta | |
| 2015/0365407 A1 | 12/2015 | Jagana | |
| 2016/0012213 A1 | 1/2016 | Walsh | |
| 2016/0012220 A1 | 1/2016 | Padidar | |
| 2016/0050226 A1 | 2/2016 | Bettini | |
| 2018/0025157 A1 * | 1/2018 | Titonis | G06F 21/56 |
| | | | 726/24 |

FOREIGN PATENT DOCUMENTS

| | | |
|---|---|---|
| WO | WO-2011069255 A1 | 6/2011 |
| WO | WO-2013116856 A1 | 8/2013 |
| WO | WO-2014003872 A1 | 1/2014 |
| WO | WO-2017074401 A1 | 5/2017 |

* cited by examiner

MOBILE URL CATEGORIZATION

CROSS REFERENCE TO OTHER APPLICATIONS

This application is a continuation of co-pending U.S. patent application Ser. No. 14/503,374 entitled MOBILE URL CATEGORIZATION filed Sep. 30, 2014 which is incorporated herein by reference for all purposes.

BACKGROUND OF THE INVENTION

Individuals are increasingly spending more time using mobile devices and less time using traditional computers. This shift in usage is present in both personal and in business contexts, and presents ongoing challenges. For example, employees of companies are increasingly using mobile devices, and in particular, mobile applications, in their work-related activities. Unfortunately, existing approaches to protecting computers and to enforcing computing-related policies are not necessarily suitable for use with mobile devices. As one example, firewalls and other security devices typically enforce policies against network traffic based on a set of rules. Requests to access content are rejected or allowed based on a classification of that content (e.g., as "pornography" or "business"). Unfortunately, mobile devices often access resources for which traditional classification techniques are inapplicable or inefficient.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
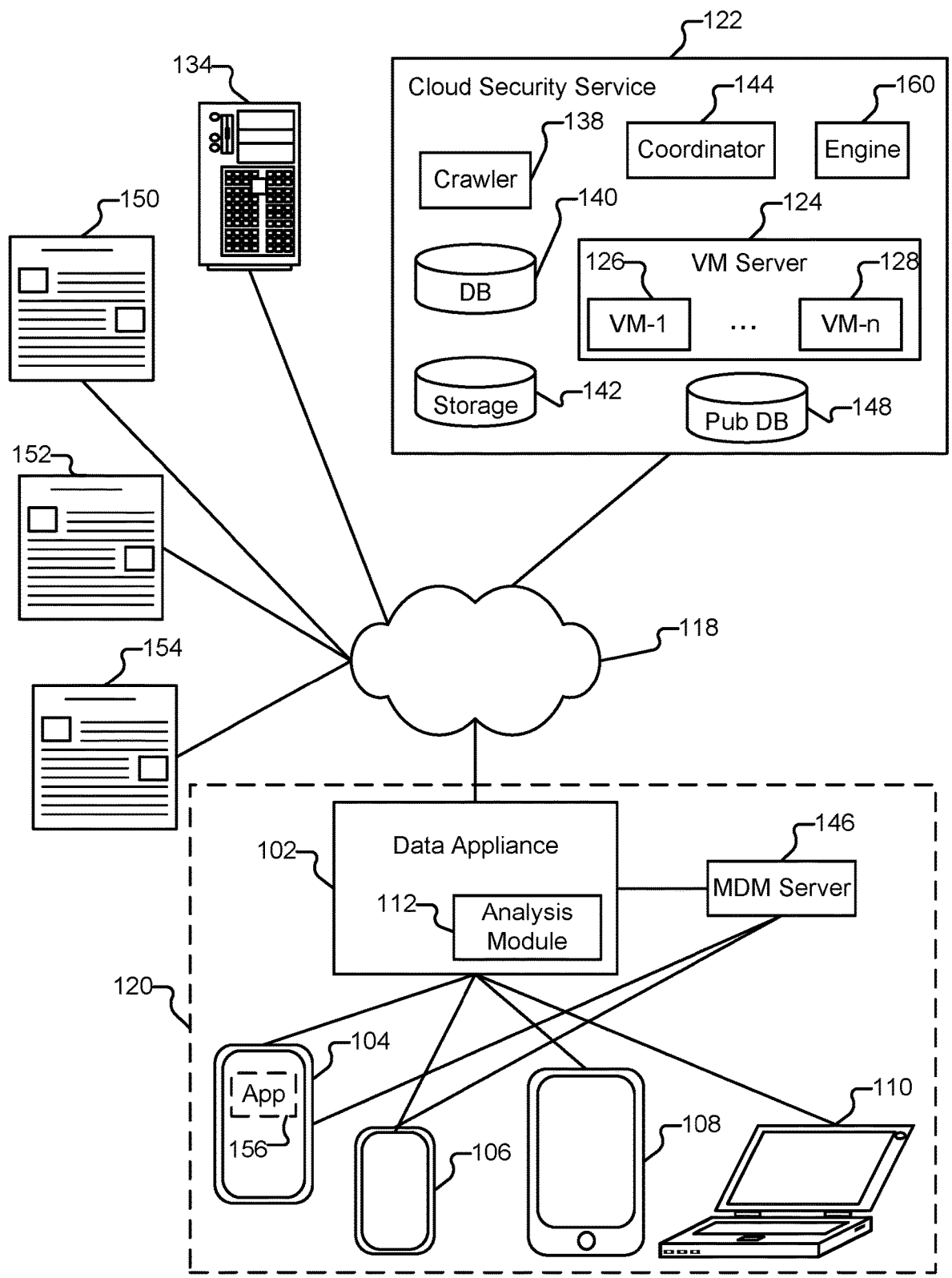
FIG. 1 illustrates an example of an environment in which Universal Resource Locators (URLs), including mobile URLs, are classified.

FIG. 1 illustrates an example of an environment in which Universal Resource Locators (URLs), including mobile URLs, are classified. As used herein, mobile URLs are those URLs used by mobile applications (e.g., application 156 installed on a device such as mobile device 104). The techniques described herein can also be used, as applicable, on other types of URLs (e.g., URLs used by embedded systems or other devices). As will be described in more detail below, classified mobile URLs can be used in a variety of ways. As one example, the classified mobile URLs can be used in policy enforcement (e.g., of security policies, traffic shaping policies, quality of service policies, and traffic routing policies). As another example, the classified mobile URLs can also be used to classify mobile applications. As yet another example, the classified mobile URLs can be used to generate training sets (e.g., for machine learning based analysis of traditional websites). The term "application" is used throughout the Specification to collectively refer to programs, bundles of programs, manifests, packages, etc., irrespective of form/platform. Accordingly, the techniques described herein can be used in conjunction with a variety of types of mobile applications available on a variety of mobile platforms (e.g., running Android, iOS, etc.).

In the example shown in FIG. 1, client devices 104-110 are present in an enterprise network 120. In particular, Client device 104 is a smartphone that runs an Android-based operating system, client device 106 is a smartphone that runs a version of iOS, client device 108 is a tablet that runs Windows Mobile OS, and client device 110 is a laptop running a version of the Linux operating system.

Data appliance 102 is configured to enforce policies regarding communications between clients such as clients 104-110, and nodes outside of enterprise network 120 (e.g., reachable via a set of one or more external networks depicted collectively in FIG. 1 as network 118). One example of a policy is a rule prohibiting any access to site 150 (a pornographic website) by any client inside enterprise network 120. Another example of a policy is a rule prohibiting access to social networking site 152 by clients between the hours of 09:00 and 18:00. Yet another example of a policy is a rule allowing access to streaming video website 154, subject to a bandwidth or other consumption constraint. Yet another example of a policy is one that logs the time spent by employees using social networking sites (e.g., where there is an understanding that employees will sometimes visit such sites throughout the workday, but should keep such activities to fifteen minutes or less per day). Policies can be made to apply to all devices equally, and can also be applied at more granular levels. For example, access to social networking site 152 can be permitted to anyone in the marketing department (e.g., users having associated group identifiers indicating their affiliation with the marketing department), and unfettered bandwidth for use with streaming video website 154 can be granted to specific users (e.g., the CEO) or groups of users (e.g., the sales department).

Other examples of policies include security policies such as ones requiring the scanning for threats in incoming (and/or outgoing) email attachments, website downloads, files exchanged through instant messaging programs, and/or other file transfers. Yet other types of policies can also be enforced by data appliance 102, such as ones governing traffic shaping, quality of service, or routing with respect to a given URL, pattern of URLs, category of URL, or other URL information. In some embodiments, data appliance 102 is also configured to enforce policies with respect to traffic that stays within enterprise network 120.

Other devices can optionally be included in network 120, such as a mobile device management (MDM) server 146, which is in communication with data appliance 102. As shown, MDM server 146 communicates with mobile devices to determine device status and to report (e.g., periodically) such mobile device status information to data appliance 102. MDM server 146 can be configured to report the presence of malicious applications installed on mobile devices, and/or can be configured to receive indications of which mobile applications are malicious (e.g., from appliance 102, from cloud security service 122, or combinations thereof). In the example shown in FIG. 1, mobile devices 104 and 106 are company issued and are registered with MDM server 146 (e.g., to receive services/enforcement from MDM server 146). In some embodiments, data appliance 102 is configured to enforce polices against mobile devices based on information received from MDM server 146. For example, if device 106 is determined to have malware installed on it (or other unapproved types of applications), data appliance 102 (working in cooperation with MDM server 146) can deny client 106 access to certain enterprise resources (e.g., an Intranet) while allowing device 104 (which does not have malware installed upon it) access to the resources. In the example shown in FIG. 1, mobile device 108 is personally owned (e.g., by employee "Alice") and does not (directly) communicate with MDM server 146, but does make use of network 120 (and has its traffic pass through data appliance 102).

Also shown in FIG. 1 is a software distribution platform 134 (also referred to as an "an app store"). Users of platform 134 (e.g., any of applicable client devices 104-108) download applications from platform 134 and install them on their devices. Example embodiments of platform 134 include Google Play, the iOS App Store, BlackBerry World, the Windows Phone Store, and the Amazon Appstore. Additional examples of software distribution platforms include third party software distribution platforms, such as the Baidu App Store, GetJar, and Handango.

Figure 2:
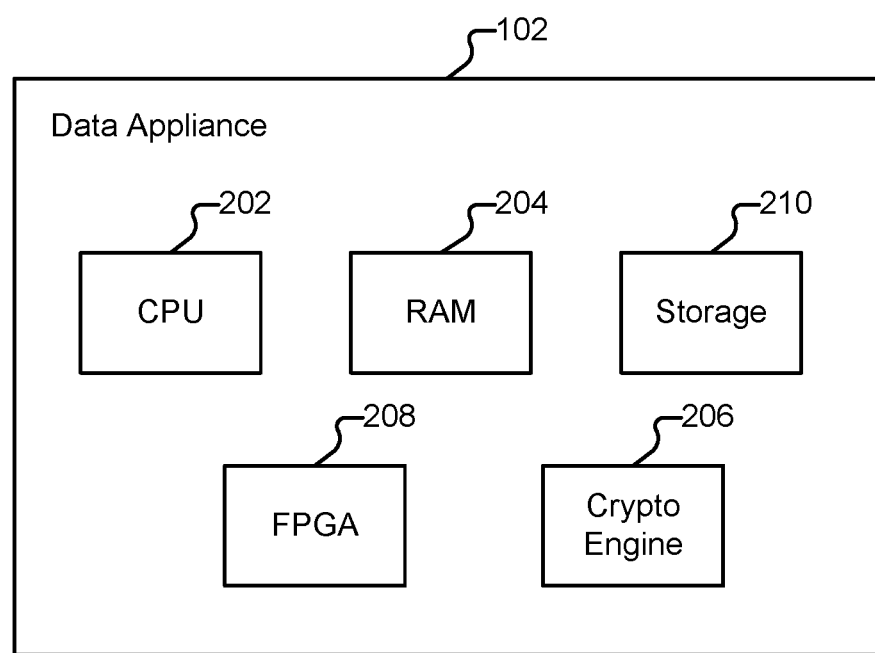
FIG. 2 illustrates an embodiment of a data appliance.

FIG. 2 illustrates an embodiment of a data appliance. The example shown is a representation of physical components that are included in data appliance 102, in some embodiments. Specifically, appliance 102 includes a high performance multi-core CPU 202 and RAM 204. Data appliance 102 also includes a storage 210 (such as one or more hard disks), which is used to store policy and other configuration information, as well as URL information. Data appliance 102 can also include one or more optional hardware accelerators. For example, data appliance 102 can include a cryptographic engine 206 configured to perform encryption and decryption operations, and one or more FPGAs 208 configured to perform matching, act as network processors, and/or perform other tasks.

Data appliance 102 can take a variety of forms. For example, appliance 102 can be a single, dedicated device (e.g., as shown), and can also be a set of devices. The functionality provided by data appliance 102 can also be integrated into or executed as software on a general purpose computer, a computer server, a gateway, and/or a network/routing device. For example, in some embodiments, services provided by data appliance 102 are instead (or in addition) provided to client 104 (or client 106, etc.) by an agent or other software executing at least partially on client 104 (or client 106, etc.).

Whenever appliance 102 is described as performing a task, a single component, a subset of components, or all components of appliance 102 may cooperate to perform the task. Similarly, whenever a component of appliance 102 is described as performing a task, a subcomponent may perform the task and/or the component may perform the task in conjunction with other components. In various embodiments, portions of appliance 102 are provided by one or more third parties. Depending on factors such as the amount of computing resources available to appliance 102, various logical components and/or features of appliance 102 may be omitted and the techniques described herein adapted accordingly. Similarly, additional logical components/features can be added to system 102 as applicable.

Figure 3:
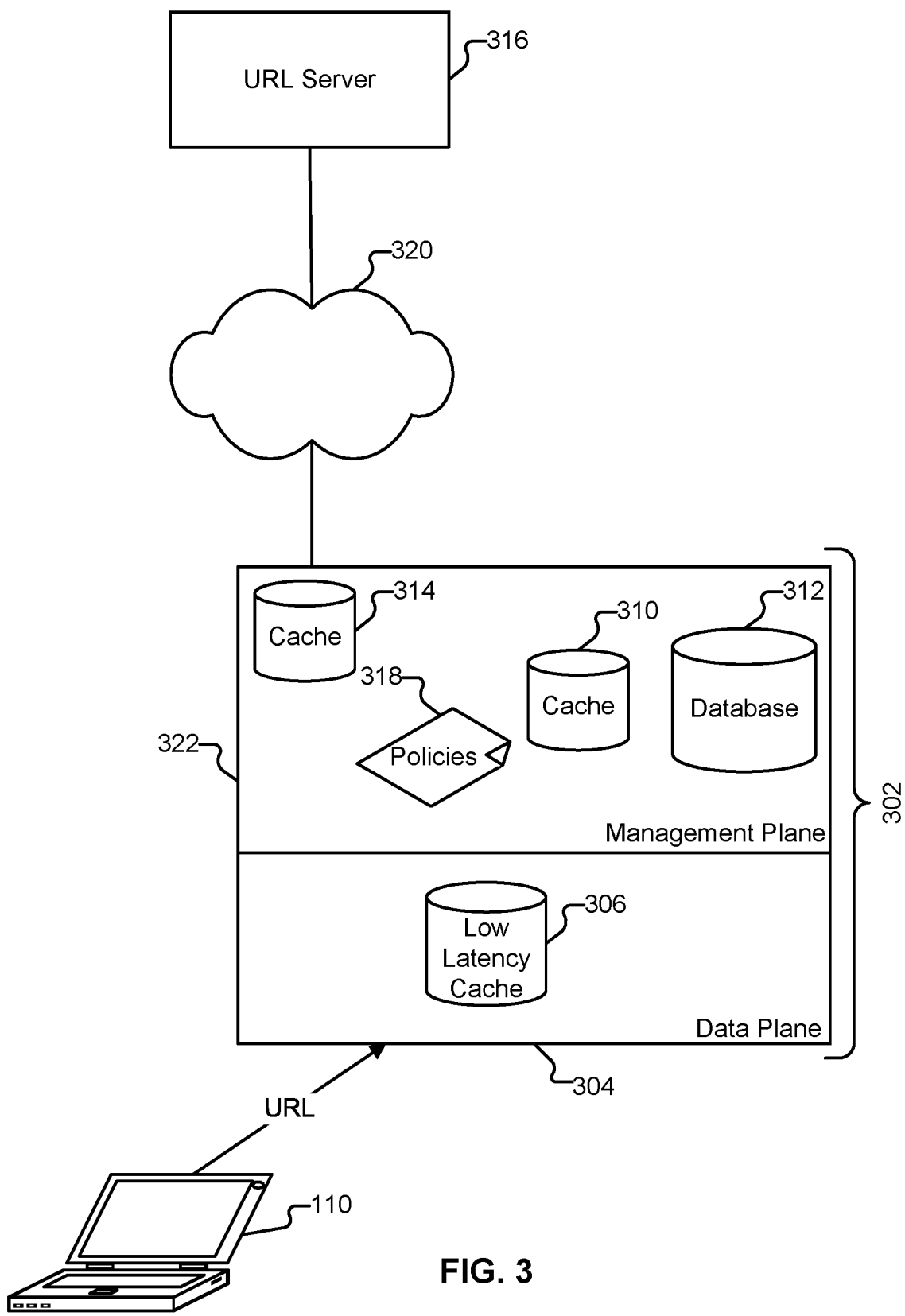
FIG. 3 illustrates an embodiment of a data appliance.

FIG. 3 illustrates an embodiment of a data appliance. In the example shown, the functionality of data appliance 102 is implemented in a firewall 302. Specifically, data appliance firewall 302 includes a management plane 322 and a data plane 304. The management plane is responsible for managing user interactions, such as by providing a user interface for configuring policies (318) and viewing log data. The data plane is responsible for managing data, such as by performing packet processing (e.g., to extract URLs) and session handling. In various embodiments, a scheduler is responsible for managing the scheduling of requests (e.g., as presented by data plane 304 to management plane 322, or as presented by management plane 322 to URL server 316).

One task performed by the firewall is URL filtering. Suppose corporate network 120 belongs to a specific company, hereinafter referred to as "ACME Corporation." Specified in firewall 302 are a set of policies 318, some of which govern the types of websites that employees may access, and under what conditions. As one example, included in the firewall is a policy that permits employees to access news-related websites. Another policy included in the firewall prohibits, at all times, employees from accessing pornographic websites. Also included in the firewall is a database 312 that contains URLs and associated categories (e.g., with bing.com being categorized as a "search engine" and with gmail.com being categorized as "web mail"). Other information can also be associated with the URLs in database 312 instead of or in addition to category information, and that other information can be used in conjunction with policy enforcement.

In some embodiments, database 312 (or at least some portions thereof) is provided by a third party, such as through a subscription service. In such a scenario, it is possible that instead of the URLs being directly stored in database 312, a transformation is applied to the URLs prior to storage. As one example, MD5 hashes of URLs can be stored in database 312, rather than the URLs themselves. In some embodiments, the URLs stored in database 312 (or transformations thereof) represent the top n URLs for which access is most likely to be sought by users of client devices, such as client 110, where n can be configured based on the computing and other resources available to firewall 302. As one example, database 312 includes 20 million URLs and is stored in storage 210. Database 312 is periodically refreshed/maintained, such as by cloud security service 122 transmitting daily (or another timescale) database updates to firewall 302. In some embodiments, also included in the firewall are various caches 306, 310, and 314 (e.g., loaded into RAM 204). In some embodiments, all or some of caches 306, 310, and 314 are omitted from firewall 302 and the processing described herein is adapted accordingly.

When a user (e.g., an employee referred to herein as "Bob") attempts to engage in activities such as web surfing, communications from and to his client (e.g., laptop 110) pass through firewall 302. As one example, suppose Bob has launched a web browser application on client 110 and would like to visit an arbitrary web page. Firewall 302 is configured to evaluate the URL of the site Bob would like to visit and determine whether access should be permitted. Suppose Bob would like to visit the front page of an online news service (www.examplenews.com) and enters its URL into his browser on client 110. In some embodiments, the URL is evaluated by firewall 302 as follows. In the first stage of the evaluation, the data plane consults cache 306 for the presence of the URL. If the URL is present in cache 306, the associated category that is also stored in cache 306 is used to enforce any applicable policies 318. If the URL is not present in cache 306, a temporary entry is inserted into cache 306 indicating that the URL is being resolved. As one example, a URL being resolved is assigned a temporary category of "UNRESOLVED." Additional requests received by firewall 302 for access to the URL will be queued pending the resolution. In various embodiments, a timeout condition is placed on UNRESOLVED entries included in cache 306, such that if the entry is not updated within a specified period of time, the entry is removed from cache 306.

Assuming the URL is not present in cache 306, the data plane sends a request to the management plane for evaluation of the URL. The URL is transformed if applicable (e.g., an MD5 hash of the URL is computed, if required). For the remainder of the discussion of this example, no distinction will be made between the URL and the MD5 (or other transformation) of the URL, to aid in clarity. It is to be assumed that if database 312 stores MD5 hashes, the queries performed against it (and corresponding operations) will be performed using MD5 (or other applicable) transformations of URLs. Cache 310 is evaluated for the presence of the URL. If the URL is present in cache 310, the corresponding category NEWS will be returned and ultimately provided to data plane 304, which will update the entry in cache 306 by changing the UNRESOLVED category associated with the URL to NEWS. The category will be used by the firewall to enforce any applicable rules. In this case, for example, Bob's attempt to access the URL with his browser will be allowed, because his request has been associated with an attempt to access a NEWS site, which is a permissible use.

If the URL is not present in cache 310, a query of database 312 will be performed using the URL. If the URL is present in database 312, the category NEWS will be returned/UNRESOLVED updated (as where it is found in cache 310). Further, cache 310 will be updated to include the returned category and URL. Suppose that the URL is not present in database 312. The management plane will next consult cache 314 to see if the URL is present therein. As with the previous processing, if the URL is present in cache 314, the corresponding category (e.g., "NEWS") will be returned as a result and can be used by the firewall in policy enforcement (and included in cache 306). If the URL is also absent from cache 314, one or more URL servers, such as URL server 316, is queried. In some embodiments, URL server 316 is made available by the provider of the contents of database 312, and contains URL information that supplements the information included in database 312 (e.g., by including many millions of additional URLs and corresponding categories). URL server 316 can also be under the control of the owner of firewall 302 or any other appropriate party. For example, while illustrated in FIG. 3 and generally described throughout as a "remote URL server," (reachable via one or more networks depicted in FIG. 3 as network 320) in some embodiments the functionality provided by URL server 316 is incorporated into data appliance 102, or is incorporated into one or more devices located within network 120 and in communication with data appliance 102. As with the previous scenarios, if the URL is present at URL server 316, the corresponding category will be transmitted by URL server 316 to data appliance 102 (and additional actions are taken by data appliance 102, such as storing the category information for the URL in cache 314, providing the category information to data plane 304 for enforcement/updating cache 306 with the category information).

In the event that the URL is also absent from URL server 316, a variety of actions can be taken. As one example, a category of UNKNOWN can be returned by URL server 316 and appropriate policies applied, based on the category, such as by blocking access to the site reachable by the URL. Cache 306 can also be updated by switching the temporary category of UNRESOLVED to UNKNOWN. In some embodiments, URLs with UNKNOWN categorization have a timeout, thus allowing for resolution of the categorization during a subsequent request. As will be described in more detail below, URL server 316 (e.g., in response to receiving a request for information on a URL for which it does not have categorization information, and/or as part of a batch operation) is configured to categorize URLs.

Returning to the environment shown in FIG. 1, an embodiment of a cloud security service 122 is shown. In particular, cloud security service 122 provides a variety of services to devices such as data appliance 102, including analyzing samples (e.g., of documents, applications, etc.) for maliciousness, categorizing applications, categorizing URLs, etc. In some embodiments, cloud security service 122 provides URL categorization services (e.g., via an embodiment of URL server 316) without providing other services such as malware analysis, as applicable. In some embodiments, in addition to providing URL categorization information (e.g., via publishing database 148), in some embodiments, cloud security service 122 makes available additional results of its analysis of mobile applications via a list of signatures (and/or other identifiers) to appliance 102 (and/or to MDM server 146) as part of a subscription. For example, cloud security service 122 can send a content package that identifies malicious applications periodically (e.g., daily, hourly, or some other interval, and/or based on an event based on a policy). An example content package includes a listing of identified malicious applications (e.g., information in the content package can include an app package name, an app hash code for uniquely identifying the app, and a malware name for each identified malware app). The subscription can cover the analysis of just those files provided by data appliance 102 to cloud security service 122, and can also cover signatures of all malicious applications known to cloud security service 122 (or subsets thereof, such as just mobile malware but not other forms of malware (e.g., PDF malware)).

In various embodiments, cloud security service 122 is configured to provide services to entities in addition to or instead of an operator of data appliance 102. For example, a carrier providing cellular service to device 104 can contract with cloud security service 122 to analyze applications which device 104 attempts to download. As another example, the owner of device 104 can contract with cloud security service 122 to analyze applications. As yet another example, an operator of app store 134 can contract with cloud security service 122 to analyze mobile applications (e.g., for a fee).

As mentioned above, one task performed by cloud security service 122 is URL categorization. Suppose the news site requested by Bob (www.examplenews.com) was not previously known to cloud security service 122 (i.e., cloud security service 122 does not have a categorization for that URL). In some embodiments, when an unknown URL is received by cloud security service 122, it is added to a queue for additional processing. URLs can be added to the queue for processing in other ways as well, such as at the request of an operator of data appliance 102. One example of processing is for the URL to be flagged for review by a human operator. For example, a human operator could visit the URL, review the content accessible via the URL, and conclude that the URL should be categorized as "NEWS," adding/updating a record associated with the URL as applicable (e.g., stored in publishing database 148 or in another appropriate location on cloud security service 122). Another example of processing is for the URL to be evaluated (at least partially) in an automated manner. As one example, crawler 138 can be configured to crawl www.examplenews.com, and natural language processing of the text and/or other content analysis can be performed on the retrieved data to determine a categorization for the site. For example, engine 160 can include one or more machine learning models (e.g., based on support vector machines, Bayes classifiers, and/or random forests) and be configured to classify the content retrieved by crawler 138. As applicable, a human operator can review any categorization determined by automated processing, prior to its inclusion in database 148, such as for quality control purposes.

Many URLs classified by service 122 (whether by a human or in an at least partially-automated manner) lead to resources (e.g., websites) that include text (typically hundreds of words per page—or more). One example of such a URL is that of the legitimate news website Bob is attempting to access with the browser application installed on client device 110 (www.examplenews.com). That site includes many news articles, each containing text that is indicative of the site pertaining to news. For example, terms such as "news" will be present in the URL itself (i.e., in www.examplenews.com), will appear in headers, footers, and articles, etc. Related terms such as "breaking" and "headline" will also appear frequently. Further, where cloud security service 122 is configured to perform automated analysis of a site such as www.examplenews.com, engine 160 (including one or more machine learning models) will determine that www.examplenews.com is a news site (e.g., having been trained on the texts of other news sites and other sites). As another example, a pornographic website can be readily classified as such by a human visitor (e.g., a human operator of service 122) based on text and other indicators. Machine learning techniques can similarly be applied to data obtained by crawler 138 from the pornographic website to classify it as such (e.g., based on text and/or other indicators, such as the presence of a paywall). As yet another example, a shopping website can be readily classified as such by a human visitor, and machine learning techniques can similarly be applied to data obtained by crawler 138 to classify it as such (e.g., based on the presence/concentration of terms such as "buy" and "checkout" and the lack of terms indicative of other types of websites, such as a dating website, e.g., "meet singles" or "have lunch").

In contrast to URLs that are typically visited by humans using browser applications, some URLs (e.g., used by mobile applications) do not lead to word-rich resources (e.g., contain very few words, if any), and thus can be problematic when classification is performed on those URLs using the approaches described above (e.g., using a human operator visiting the URL, and/or using machine learning models trained on traditional website content). As one example, suppose that in addition to owning mobile device 108, Alice was issued Android-based smartphone 104 by ACME Corporation. A variety of mobile applications are installed on smartphone 104, some of which rely on network access to function properly. As one example, suppose Alice has a social networking application 156 installed on smartphone 104. Social networking application 156 allows Alice to send pictures of herself to her friends, and to receive similar pictures back from her friends. Social networking application 156 is produced by the owners of social networking site 152. Data appliance 102 is configured with policies limiting employee access to social networking sites (such as site 152) during business hours (e.g., from 09:00-18:00). And, an entry classifying social networking site 152 as SOCIAL NETWORKING is present in database 312. Accordingly, if Alice were to visit site 152 using a browser application (whether on her work computer, or on smartphone 104 when smartphone 104 makes use of network 120, e.g., via an access point provided by ACME Corporation), her access to the site would be blocked by data appliance 102 between 09:00 and 18:00. However, the social networking application installed on smartphone 104 does not necessarily need to make use of site 152 (whether via its domain name or IP address) to function, and the network resources that app 156 does use may not provide meaningful indicators of their nature to a human or to a crawler. As one example, the application may make use of a service accessible via a URL that does not contain content crawlable by a web crawler. As additional examples, the application may make use of servers, proxies, content delivery networks, etc., which do not obviously correspond (exclusively) to site 152.

If Alice uses social networking application 156 while inside network 120, and if (as in this example) database 312 does not include information classifying the URLs used by application 156, data appliance 102 (without additional information) may not handle application 156's traffic as intended by the administrators of network 120. For example, if data appliance 102 is configured to block access to URLs classified as UNKNOWN, Alice will be unable to use app 156 to send or receive pictures (or the application will otherwise operate with reduced functionality due to one or more blocked URLs), even when she would otherwise be permitted to use social networking site 152 (e.g., between 18:00 and 9:00). If data appliance 102 is configured to allow access to URLs classified as UNKNOWN, Alice will be able to use app 156 to send/receive pictures during business hours (e.g., 9:00-18:00) contrary to ACME Corporation's corporate policy. If at least a portion of the URLs used by social networking app 156 were categorized (i.e., assigned a category other than UKNOWN), data appliance 102 would be able to better enforce ACME Corporation's intended policies (e.g., allowing social networking access outside of business hours, and prohibiting it otherwise). Various ways in which cloud security service 122 (or other platforms/ devices implementing techniques described herein, as applicable) can classify mobile URLs are described below. Further, using the techniques described herein, analysis performed on a version of a mobile application compiled for one type of device (e.g., analysis of an Android APK) can be used to enforce policies against the same application as compiled for a device of a different type (e.g., an iOS device), where both versions of the application make use of (at least some of) the same URLs.

Returning to FIG. 1, as mentioned above, in various embodiments, cloud security service 122 includes a crawler 138. Cloud security service 122 can use crawler 138 (or another appropriate mechanism) to obtain copies of mobile applications, such as app 156 for evaluation. As one example, crawler 138 can be configured to periodically crawl platform 134 and/or other locations hosting applications for download (such as web forums), looking for new or updated applications. Such applications can then be analyzed by cloud security service 122. In addition to an application itself, crawler 138 also obtains (e.g., from platform 134) contextual information associated with the application. Examples of such contextual information include a textual description of the application, information associated with the author/developer of the application, reviews of the application, platform 134's classification of the application (e.g., into which section of an app store the application has been placed, such as "Games" or "Productivity"), and a list of similar applications (e.g., provided by the app store).

In some embodiments, platform 134 makes copies of applications available to cloud security service 122 via an Application Programming Interface (API) instead of or in addition to crawler 138 obtaining such copies. Cloud security service 122 can also obtain copies of applications for analysis from other sources. For example, data appliance 102, MDM server 146, and device 104 could each be configured to provide a copy of an application (e.g., app 156) to cloud security service 122, whether directly (e.g., data appliance 102 transmitting the application) or indirectly (e.g., MDM server 146 or device 104 transmitting the application to data appliance 102, which in turn provides it to cloud security service 122).

Copies of received applications (i.e., awaiting analysis) are stored in storage 142 and analysis is commenced (or scheduled, as applicable). As will be described in more detail below, results of the analysis (and additional information pertaining to the applications) are stored in database 140, as is, in some embodiments, information pertaining to components incorporated into various applications. Some of the information stored in database 140 (e.g., pertaining to URL classification) is also provided to publishing database 148.

Cloud security service 122 can comprise one or more dedicated commercially available hardware servers (e.g., having multi-core processor(s), 8 G+ of RAM, gigabit network interface adaptor(s), and hard drive(s)) running typical server-class operating systems (e.g., Linux). In various embodiments, service 122 is implemented across a scalable infrastructure comprising multiple such servers, solid state drives, and/or other applicable high-performance hardware. Cloud security service 122 can comprise several distributed components, including components provided by one or more third parties. For example, portions or all of cloud security service 122 can be implemented using the Amazon Elastic Compute Cloud (EC2) and/or Amazon Simple Storage Service (S3). Further, as with data appliance 102, when cloud security service 122 is referred to as performing a task, such as storing data or processing data, it is to be understood that a sub-component or multiple sub-components of cloud security service 122 (whether individually or in cooperation with third party components) may cooperate to perform that task. As one example, cloud security service 122 can optionally perform its analysis in cooperation with one or more virtual machine (VM) servers, such as VM server 124.

An example of a virtual machine server is a physical machine comprising commercially available server-class hardware (e.g., a multi-core processor, 4+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers cloud security service 122, but may also be provided by a third party. As one example, the virtual machine server can rely on EC2, with the remainder portions of cloud security service 122 provided by dedicated hardware owned by and under the control of the operator of cloud security service 122. In some embodiments, virtual machine server 124 is configured to provide one or more virtual machines 126-128 for emulating mobile devices. The virtual machines can execute a variety of operating systems and/or versions thereof. Observed behaviors resulting from executing mobile applications in the virtual machines are logged and analyzed (e.g., for classifying URLs used by the application, and for other purposes, such as examining the application for indications that the application is malicious). In some embodiments the log analysis is performed by the VM server (e.g., VM server 124). In other embodiments, the analysis is performed at least in part by other components of service 122, such as coordinator 144. As will be described in more detail below, a combination of static and dynamic analysis can be performed on mobile applications, for a variety of purposes, including to obtain/classify the URLs they use.

Figure 4:
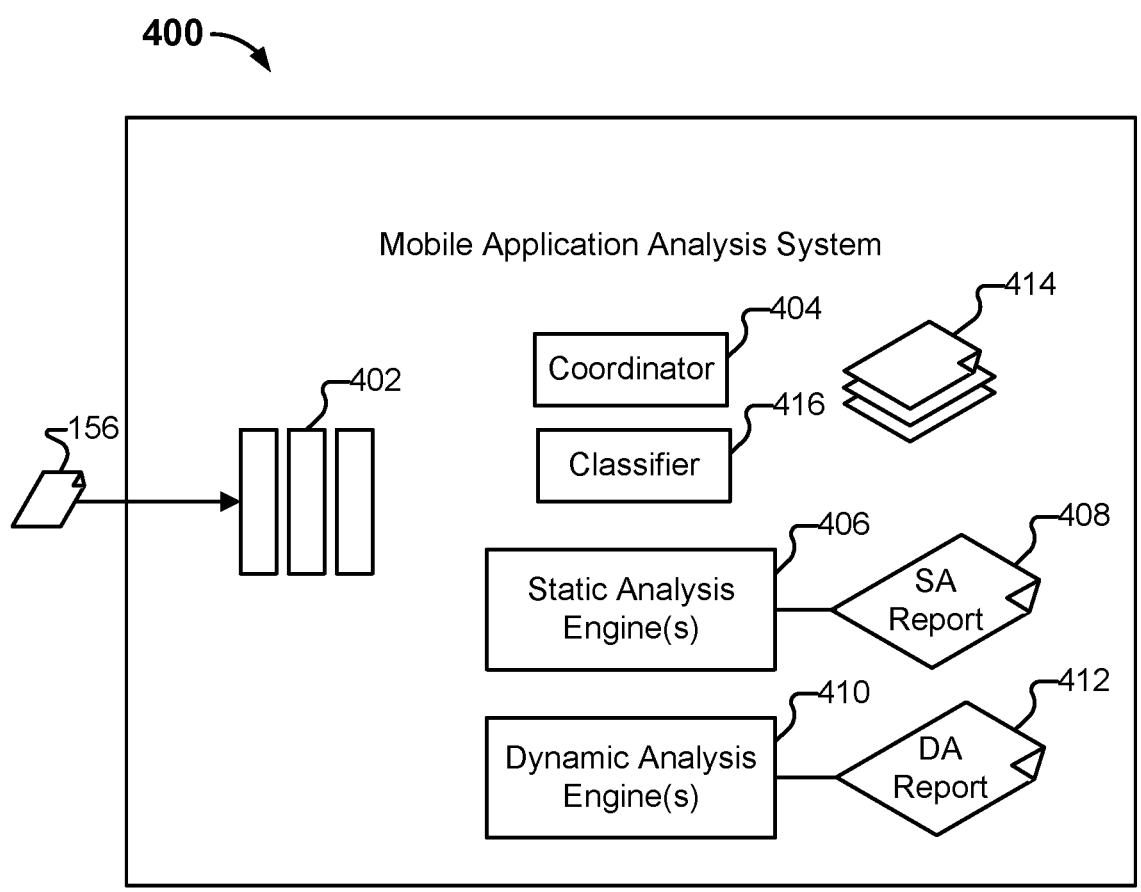
FIG. 4 illustrates an example of logical components that can be included in a system for analyzing a mobile application.

FIG. 4 illustrates an example of logical components that can be included in a system for analyzing a mobile application. System 400 can be implemented using a single device. For example, the functionality of system 400 can be implemented on data appliance 102 which includes an analysis module 112 (an embodiment of system 400). System 400 can also be implemented, collectively, across multiple distinct devices. For example, the functionality of system 400 can be provided by cloud security service 122.

As shown in FIG. 4, system 400 is configured to perform both static and dynamic analysis on an application. During the static analysis portion of the analysis, the application (also referred to herein as a "host application" or "host APK") is reversed into a "reversed host application" (also referred to herein as a "reversed host APK") by static analysis engine 406. As one example, static analysis engine 406 can use Android apktool to reverse an APK file into an intermediate source code form. The reversed host application is (in some embodiments) a directory structure (e.g., including one or more subdirectories) of source (and/or intermediate) code and resource files reversed from a given host application. As one example, the output of the reversing operation having been performed on socialnetwork.apk is a set of .smali files—the direct output of the disassembly from Dalvik virtual machine language, and other resource files included in the APK file. Instead of or in addition to processing Android APK files, similar approaches can be used by static analysis engine 406 to process mobile applications for other platforms (e.g., iOS applications or Windows Mobile applications).

As will be described in more detail below, various features are extracted from the application during static analysis. One example of such a feature is a list of URLs hard coded into the application. The presence of indicator keywords for a particular categorization (e.g., "bet" or "wager" for GAMBLING; "cart" or "checkout" for SHOPPING; "singles" or "love" for DATING; etc.) can also be scanned for in the source code during static analysis.

Applications will typically include code written by the application's developer (e.g., providing the logic of how the application works), as well as third party code. Examples of such third party code include an animation library to assist in rendering graphics, an advertising library that allows users of the game to play for free in exchange for viewing advertisements (with the game developer receiving a cut of the advertising revenue), and a payment system library to collect "in-app" payments from users. Other examples of third party code/libraries include those that provide accessorial functionalities such as mobile advertisements, usage statistics, encryption/coding, and social networking. The third party code typically is not directly related with the host application and in some cases may run autonomously from the host application after installation. At least some of these libraries may make use of URLs, meaning many applications available from platform 134 might incorporate the same third party advertising library and thus make use of the same URLs. Further, there exist other URLs (which may or may not be associated with a third party library) that are commonly used by a large number of mobile applications. Examples of URLs commonly used in mobile applications include www.google.com, w3c.com, www.paypal.com, maps.google.com, etc. Such commonly occurring URLs are referred to herein as "infrastructure URLs," as distinguished from URLs used by only a small number of (and often only by a single) applications.

During the dynamic portion of the analysis, behaviors performed by the application are analyzed. Additional features are extracted during dynamic analysis, an example of which is a list of any URLs dynamically generated by the application (i.e., URLs accessed by the application that are not hard coded/were otherwise not discovered during static analysis).

In various embodiments, system 400 makes use of additional contextual information associated with the application being analyzed (collectively shown in FIG. 4 as collection of information 414). Collection 414 can be obtained in a variety of ways, including via a subscription service (e.g., provided by a third party) and/or as a result of other processing (e.g., performed by data appliance 102 and/or service 122). One example of information included in collection 414 is information pertaining to the application obtained by crawler 138 crawling a source of the application such as platform 134. As mentioned above, examples of such crawled information can include a description of the application (e.g., as the description appears on platform 134), reviews of the application, information pertaining to the author/developer of the application (and any other applications produced by the same author/developer), a list of other mobile applications related to the application (e.g., as deemed by platform 134), and any other information pertaining to the application. In various embodiments, additional information is also made available to system 400 when analyzing applications, such as URLs of known malicious websites; URLs of known safe websites; signatures, hashes, and/or other identifiers of known malicious applications; signatures, hashes, and/or other identifiers of known safe applications; signatures, hashes, and/or other identifiers of known malicious files (e.g., Android exploit files); signatures, hashes, and/or other identifiers of known safe libraries; and signatures, hashes, and/or other identifiers of known malicious libraries.

Ingestion

In various embodiments, when a new mobile application is received for analysis (e.g., an existing signature associated with the mobile application is not present in system 400), it is added to processing queue 402. In the following example, suppose the application is called "socialnetwork.apk," (Alice's social networking app 156). The Android application package "socialnetwork.apk" is an example of a "host APK."

As explained above, a mobile application can be received for analysis in a variety of ways. As one example, a mobile application can be received by data appliance 102 for analysis when data appliance 102 intercepts a request, made by Alice, to install the application from platform 134. As another example, a mobile application can be received by data appliance 102 when (having already installed app 156) Alice attempts to use the application on network 120. Additional examples of the receipt of a mobile application include: (1) receipt by service 122 of the application from data appliance 102, (2) receipt by service 122 of the application from platform 134 for analysis (e.g., via an API), and (3) crawling by service 122 of systems such as platform 134.

Static Analysis

Coordinator 404 (an example embodiment of coordinator 144) monitors the queue, and as resources (e.g., a static analysis worker) become available, coordinator 404 fetches an application from queue 402 for processing (e.g., fetches socialnetwork.apk). In particular, coordinator 404 first provides the application to static analysis engine 406 for static analysis. In some embodiments, one or more static analysis engines are included within system 400, where system 400 is a single device. In other embodiments, static analysis is performed by a separate static analysis server that includes a plurality of workers (i.e., a plurality of instances of static analysis engine 406).

The static analysis engine obtains general information about the application and includes it (along with heuristic and other information, as applicable) in a static analysis report 408. The report can be created by the static analysis engine, or by coordinator 404 (or by another appropriate component) which can be configured to receive the information from static analysis engine 406. In some embodiments, the collected information is stored in one or more database records for the application (e.g., in database 140), instead of or in addition to a separate report 408 being created (i.e., portions of the database record form the report 408). Examples of collected information include: the package name, shared UID, APK file signer information, permissions claimed, and sensitive API calls included in the source (e.g., sending or erasing SMS messages, accessing the phonebook, and tracking user location changes), URLs embedded in the source code, presence of keywords indicative of categorization, etc. The static analysis engine also collects and stores information pertaining to the running context of the application, such as: the minimum version of the Android OS required to run the application (the minimum SDK version), and the sensors it will have access to.

Dynamic Analysis

Once the static analysis is complete, coordinator 404 locates an available dynamic analysis engine 410 to perform dynamic analysis on the application. As with static analysis engine 406, system 400 can include one or more dynamic analysis engines directly. In other embodiments, dynamic analysis is performed by a separate dynamic analysis server that includes a plurality of workers (i.e., a plurality of instances of dynamic analysis engine 410).

Each dynamic analysis worker manages a mobile device emulator (e.g., running in a virtual machine). In some embodiments, results of the static analysis (e.g., performed by static analysis engine 406), whether in report form (408) and/or as stored in database 140, or otherwise stored are provided as input to dynamic analysis engine 410. The static report information is used to help customize the type of dynamic analysis performed by dynamic analysis engine 410, conserving resources and/or shortening the time required to evaluate an application. As one example, if static analysis has concluded that the application does not have the ability to access SMS messages, during dynamic analysis, the receipt of SMS messages will not be simulated in some embodiments. As another example, if static analysis has concluded that the only access the application has to a sensitive permission (e.g., the ability to read SMS messages) is via a library included in the common group, and is not via libraries in the core or unrecognized group, certain triggering actions (e.g., the receipt of SMS messages) can similarly not be simulated. As another example, if static analysis has concluded that the application has the ability to access GPS information, during dynamic analysis, various changes in location of the device can be simulated. However, if the application lacks the ability to access GPS information, in some embodiments no location changes will be simulated (reducing the amount of time/computing resources needed to complete dynamic analysis). Similarly, even where the application has the ability to access GPS information, if that information is only accessed via a library included in the common group, in some embodiments no location changes will be simulated.

Dynamic analysis engine 410 can determine which emulator(s) to run based on the minimum operating system version number required by the application (and determined during static analysis). If the minimum version number is Android 4.0, dynamic analysis engine 410 will launch an Android emulator having that version number (and, in some embodiments, will not attempt to emulate a lower version of Android). If the minimum version number is Android 2.3, multiple emulators can be used to evaluate the application (e.g., Android 2.3, and any higher versioned emulators, such as Android 4.0). Where multiple emulators are used, a single dynamic analysis engine can manage all of the emulators (whether in sequence or in parallel), or multiple dynamic analysis engines can be used (e.g., with each managing its own emulator), as applicable.

One example of how dynamic analysis can be performed on an application is as follows. The dynamic analysis engine/worker begins analysis by preparing and setting up the running environment for the application to be tested. As explained in more detail below, the environment is instrumented/hooked such that behaviors observed while the application is executing are logged. Examples of operations carried out by the dynamic analysis engine/worker include: (1) determining which system services should be started (e.g., simulated motion sensor readings and simulated location changes); and (2) determining what set of simulated user operations should take place (e.g., performed after installation, in sequence).

The dynamic analysis engine/worker loads an appropriate emulator (e.g., Android version 2.3) and installs the application to be analyzed. As mentioned above, the emulators used by mobile malware analysis system 400 are instrumented. For example, they are configured to log activities as they occur in the emulator (e.g., using a customized kernel that supports hooking and logcat). Further, network traffic associated with the emulator is captured (e.g., using pcap).

The application is executed and various applicable actions (e.g., selected based on static analysis report 408) are performed (e.g., by the dynamic analyzer executing commands via an Android Debug Bridge ("adb") connection and/or through the use of a service coordinator included in the modified emulator and configured to orchestrate the simulation of user events such as button presses as commanded by the dynamic analysis engine). As one example, if the application was determined during static analysis to have access to location information, changes in location will be simulated in the emulator.

Any resulting behaviors performed by the application are logged. In some embodiments, the log data is stored as a temporary file on system 400. The generated log file (or a separate file associated with the log file, as applicable) includes information such as a list of URLs accessed by the application while running.

In some embodiments, dynamic analysis is performed in two stages. In particular, after the application has been installed and executed (with associated simulated information/events) and a first log file is created (e.g., "logcat1.txt"), a reboot of the emulator is performed and the application is launched and interacted with again, resulting in a second log file (e.g., "logcat2.txt"). Dynamic analysis engine 410 evaluates both log files, along with any network traffic captured during the two stages (e.g., using pcap).

As with the static analysis engine, the dynamic analysis engine stores the results of its analysis in database 140 in the record(s) associated with the application being tested (and/or includes the results in report 412 as applicable).

Figure 5:
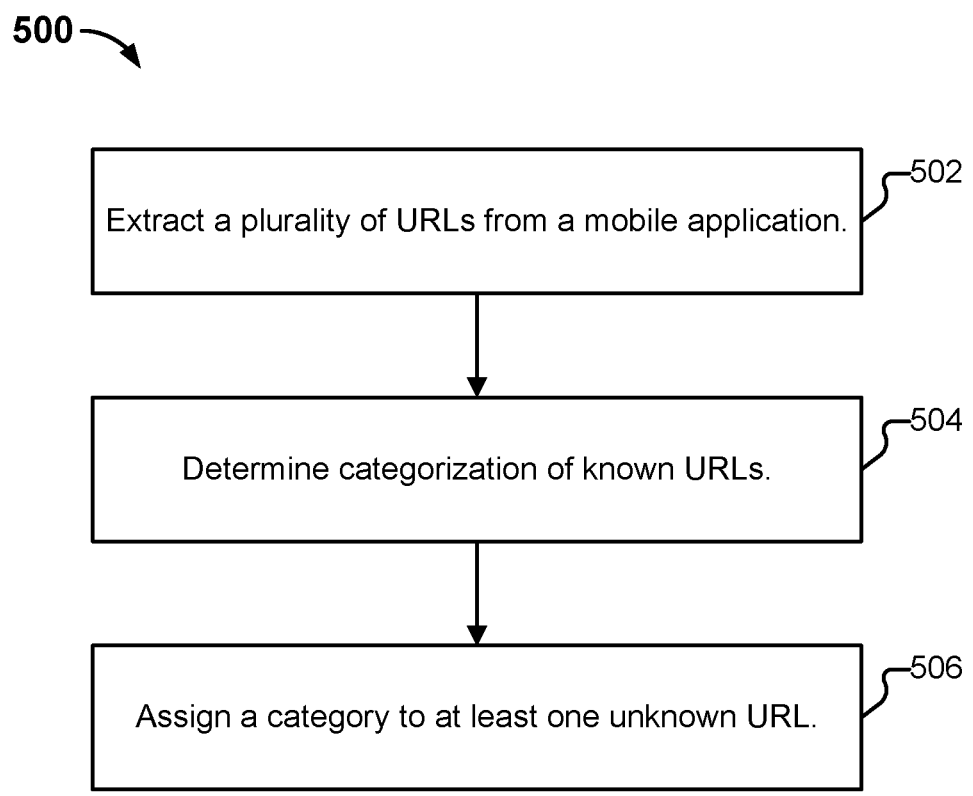
FIG. 5 illustrates an embodiment of a process for classifying a mobile URL.

Classifier 416 takes as input URLs (e.g., the URLs extracted from a mobile application during static/dynamic analysis) and attempts to classify the UNKNOWN URLs it receives. FIG. 5 illustrates an embodiment of a process for classifying a mobile URL. In various embodiments, process 500 (or portions thereof) is performed by classifier 416. The process begins at 502 when a plurality of URLs extracted from a mobile application is received. As one example of the processing performed at 502, as explained above, during static and dynamic analysis of a given application, such as application 156, URLs (whether hardcoded or dynamically generated) will be extracted from the application and stored in database 140. The extracted URLs can also be placed in other locations, such as in RAM, in a different database, etc., for use in processing. Classifier 416 receives those extracted URLs (e.g., by reading database 140, by being alerted by coordinator 404, etc.) at 502.

At 504, any existing mappings between the URLs received at 502 and classifications (e.g., in database 148) are determined. As one example of the processing performed at 504, suppose that static/dynamic analysis of socialnetwork.apk revealed that the application makes use of a total of 10 URLs. As mentioned above, some of the extracted URLs may be "infrastructure URLs"—URLs used by many different applications. Further (and irrespective of whether they are "infrastructure" URLs or not), some of the extracted URLs may already have known classifications (e.g., have entries in database 140 or database 148 as applicable). Returning to the example of socialnetwork.apk, a variety of scenarios could occur at portion 504 of process 500, including the following:

None of the ten URLs is present in database 148, meaning each URL is considered UNKNOWN.

At least one of the ten URLs is determined to be an infrastructure URL (with some portion of the remaining URLs UNKNOWN).

At least one of the ten URLs has an existing classification (e.g., SHOPPING).

Multiple URLs have an existing classification (e.g., two SHOPPING, four SOCIAL NETWORKING, four UNKNOWN; or three GAMBLING, seven UNKNOWN).

(In the event that all ten URLs have existing classifications, in some embodiments no additional processing by classifier 416 need be performed.)

At 506, a category is assigned to at least one UNKNOWN URL in the set of URLs extracted at 502. Categories assigned at 506 are stored in database 140 (and can be included in publishing database 148 for propagation to devices such as data appliance 102 for enforcement). As applicable, publishing database 148 can be populated by extracting classified URLs out of database 140 and applying any additional processing, such as adding annotations.

As will be described in more detail below, the classification can be determined based on a variety of factors, including a combination of factors. In some cases, an intermediate determination is made as to a categorization of the application being processed. The classification assigned to the application as a whole (e.g., by classifier 416) can be used to assign categories to UNKNOWN URLs used by the associated application. Thus, for example, where an application includes ten URLs, six of which are classified as SHOPPING, one of which is classified as ADS, and the remainder of which are UNKNOWN (and, optionally, where additional information, such as textual analysis of the application description and/or source code indicates that the application is a shopping application), the overall classification of the application as a shopping application can be used to impute a SHOPPING category to each of the UNKNOWN URLs. The following are examples of such factors (also referred to herein as "features"), and example ways they can be used to categorize UNKNOWN URLs.

Category Distribution Vector

In some embodiments, classifier 416 is configured to filter out any infrastructure URLs determined for an application's URL set at 504. Any remaining (non-infrastructure) URLs that have existing classifications can be used as votes for their respective categorization as an appropriate category for the mobile application as a whole. Using one example, where the set of ten URLs for socialnetwork.apk includes two known URLs previously classified as SHOPPING and four known URLs previously classified as SOCIAL NETWORKING, a category distribution vector can be constructed to hold that information (e.g., "0, 0, 0, 0 . . . , 2, 4, . . . 0" where the zeros in the vector correspond to the other possible categorizations). Using another example, where the set of ten URLs for socialnetwork.apk includes three known URLs previously classified as GAMBLING and no other known-classified URLs, the category distribution vector could be represented as "0, 0, 0, 0 . . . , 3, . . . 0" (where, as before, the zeros in the vector correspond to the other possible categorizations). If the value for a given category in the vector meets/exceeds a threshold (e.g., 70%) and, as applicable, where a threshold number of URLs are used by the application, in some embodiments classifier 416 deems the application as belonging to that category. For example, suppose eight of the ten URLs included in an APK were previously classified as being ADULT. A determination can be made that the remaining two URLs should also be classified as ADULT. In other situations (or, as applicable, in various embodiments) the category distribution vector is one of multiple factors considered. Further, where no one category stands out as being predominant (e.g., a vector that includes 2-3 votes from 2-3 different categories, or where the application has few URLs overall), the UNKNOWN category can be maintained, and/or other factors/features can be considered, as applicable.

Textual Hints from Static Analysis

In various embodiments, service 122 includes, for each category included in database 148, a list of pre-defined keywords. For example, the GAMBLING category would have associated keywords of "poker," "bet," "wager," "odds," etc. The presence of such keywords in the source code (e.g., in variable names/routines and in source code comments) can be highly probative of what the application does (i.e., how it should be categorized). As with the Category Distribution Vector, a vector of keyword matching results can be computed for an application that reflects how prevalent keywords of the respective categories are in the application's source code. Where the score for a given category exceeds a threshold (or the source code otherwise indicates that it contains a threshold amount of keywords for a given category), the keyword match results can be used as the sole consideration of classification by classifier 416. The keyword match results can also be used as one factor among multiple factors.

Textual Hints from Platform 134

As explained above, applications appearing on platform 134 are accompanied by various textual components, such as the application's description on platform 134, and (if applicable) reviews of the application. Such text can be crawled (e.g., by crawler 138) and mined (e.g., using an un-supervised machine learning method such as Latent Dirichlet Allocation, using engine 160, etc.) to the collected text, resulting in a list of topics and associated keywords. The keywords can be mapped into one of the existing URL categories, such that the Latent Dirichlet Allocation topic distribution is mapped into a URL category distribution. In various embodiments, the same engine responsible for categorizing traditional websites (i.e., those sites containing significant amounts of text and/or otherwise frequently visited by humans using browsers), such as engine 160, also classifies the textual description/review information extracted from platform 134. In other embodiments, the analysis of platform 134's information is performed by a separate module.

Other Contextual Information from Platform 134

Developer Information: Developers often develop multiple applications within a same category. For example, a game developer will tend to make multiple game applications, rather than some game applications and some productivity applications. The categorization of other applications by the same developer can be used as a feature when assigning a category to the application being processed by classifier 416 (which, as explained above, can in turn be used to assign a category to an UNKNOWN URL used by the application). For example, suppose a given developer has a total of ten applications available on platform 134. Nine of the applications are classified by platform 134 as gambling applications, and one is classified as shopping. Service 122 can maintain (e.g., in database 140) a vector (or other data structure) that represents the category distribution of the developer's applications (e.g., "0, 0, 0, 0, . . . , 9, . . . 1, 0" with the 9 representing nine gambling applications and the one representing one shopping application).

Application Categorization: As explained above, platform 134 groups applications together for perusal by downloaders based on its own notion of categorization. For example, platform 134 groups games together, productivity applications together, etc. In some embodiments, the category assigned by platform 134 to an app is used as a feature. It may be the case that platform 134 and service 122 use different classification schemes. For example, platform 134 may use ten categories, with little specificity, while service 122 may use sixty or more categories (including hierarchical categories, such as productivity-document editing vs. productivity-calendaring). In some embodiments, a mapping exists between the two categorization schemes, and the categorization of an application by platform 134 is still used as a feature, after conversion to the scheme used by service 122. One example of mapping is as follows. The category "Entertainment" on platform 134 can be mapped to each of four categories on service 122 (e.g., "Movies," "Streaming-Media," "Shareware-and-Freeware," and "Comptuer-and-Internet"). In some cases the categories are more specific versions of the same category (e.g., "Movies" vs. "Entertainment") and in other cases, take into account different/broader meanings of the category (e.g., "Shareware-and-Freeware" games provide "Entertainment"). In other embodiments, the categorization obtained from platform 134 is used for quality control purposes (e.g., as a final check against a category that would be assigned by classifier 416 absent that information), prior to adding a classification to database 140. For example, if classifier 416 determines, based on the techniques described herein, that an application should be classified as an ADULT application, but platform 134 has the application categorized as being in a COOKING category—classifier 416 can conclude that the analysis it performed is not sufficiently reliable and opt to leave the UNKNOWN URLs as UNKNOWN, rather than potentially erroneously categorizing them as being ADULT.

Similar Applications: Given an input of one application, platform 134 is able to provide a list of applications that it considers "similar" to the given application. One way that the list of similar applications can be used is to expand limited information associated with a given application. For example, some of the applications available via platform 134 make use of a limited number of URLs (e.g., fewer than five URLs used by the application). Evaluations such as those based on Category Distribution Vectors may be less reliable where there are few URLs (contrasted with applications which make use of, e.g., ten or more URLs). One approach to improving reliability is for classifier 416 to "borrow" the URLs used by the related applications when examining a given application. For example, to compute a more reliable Category Distribution Vector, classifier 416 can perform the analysis at 504 using an expanded set of URLs—those used by the application being evaluated, and those URLs used by "similar" applications. In some embodiments, the list of similar applications (as provided by platform 134) is used without modification. In other embodiments, the list of similar applications is refined by service 122. For example, Service 122 can perform a shared nearest neighbor evaluation. In such an evaluation, if Application A and Application B share a threshold number of applications (or percentage of applications) in their respective similar application list as provided by platform 134 (e.g., at least four in common, or at least 55% in common), then Application A and Application B can be said as "similars" of one another by classifier 416. As explained above, "similar application" information (including as obtained directly from platform 134, and as optionally refined by service 122) is an example of data that can be stored in database 140 for use by classifier 416 (e.g., as information 414).

Final Verdict

Once all the features are generated, a decision rule is applied by classifier 416 to combine the features to make a final categorization decision for the URL. As mentioned above, some features are more accurate/reliable than others, and, a decision rule can accordingly weight the features to take such differences into account. As one example, a decision rule can be specified (e.g., for use by classifier 416) that, where a category's value in a category distribution vector exceeds a threshold (e.g., 80%), that category is assigned to the application (and thus any UNKNOWN URLs) without regard for any other features. As another example, a decision rule can be specified that where, e.g., the category distribution vector result and static analysis of textual hints both exceed a respective threshold, whichever feature has a higher score (e.g., category distribution vector result or textual hint from static analysis result) will control (i.e., will have its category assigned). As yet another example, each type of feature can be assigned a reliability score and a weighted overall score computed (e.g., with category distribution results given a 0.7 multiplier, textual hints from static analysis given a 0.7 multiplier, and other (potentially less reliable) factors, such as other-applications-by-developer given a 0.4 multiplier). In other embodiments, all features are given equal weights, and a majority vote applies (e.g., requiring at least 50% of the feature to indicate a particular category in order for that category to be assigned). As mentioned above, if no category is designated (based on the application of the decision rule), in various embodiments, the URL remains UNKNOWN.

The following is one example of a final verdict analysis, performed on an UNKNOWN URL ("hsmart.mobi") extracted as one of two URLs from an app present in platform 134. The URL has no crawlable content, and thus cannot be classified using traditional machine learning techniques. Example features for analysis of the URL are as follows:

The category for the application derived by examining the description of the application on platform 134 is "gambling." The category assigned to the application by platform 134 is "Cards & Casino." Information stored about the developer in database 140 shows that the developer has developed a total of 11 applications, of which 27% are gaming applications. The category distribution vector for the application is "search-engines:0.5, unknown:0.5." As mentioned above, with only two URLs, the category distribution vector is less likely to be reliable than where more URLs are included. A list of similar applications (comma separated) provided by platform 134 is obtained and includes: "com.dragongames.dragonplaypoker, com.cybershull.prisonpoker, mede.pokerhd, com.mobile.TX holdem, com.googame.pokerkingblue, com.cowboycardsharks, . . . " Using this list of similar applications, a majority vote based on the URLs included in the related applications is "gambling, 0.574468085106383," meaning 57% of similar apps are classified as gambling. In this scenario, the application will be classified as GAMBLING, based on the expanded category distribution vector, and as confirmed by comparing the verdict "GAMBLING" to the categorization provided by platform 134. The UNKNOWN URL, hsmart.mobi, will accordingly be classified as GAMBLING (e.g., in database 148) going forward, and usable by devices such as appliance 102 to enforce rules against that URL in the future.

Additional Processing

In addition to resolving UNKNOWN URLs into categorized ones (e.g., for inclusion in publishing database 148), the analysis performed by classifier 416 can be used for other purposes. Examples are as follows:

Training Data:

Mobile URLs classified using the techniques described herein can be used to "harvest" URLs associated with given categories and use those harvested URLs as training samples for the traditional webpage classifier (e.g., included in engine 160 and tasked with classifying arbitrary traditional websites) to improve accuracy. As one example, mobile URLs can be grouped by assigned category, normalized tf-idf vectors calculated for each URL, and an average normalized tf-idf vector calculated for the category. A percentage of each category furthest in cosine-distance from the average vector for that category is dropped (e.g., 20%), creating a set of new training vectors. The resulting set of training vectors (the set of URL-category mappings) can be considered as possible training examples. For each category, the examples are added to the existing training set to see if the accuracy of that category improves. If it does, the examples can be permanently added to the set and considered analogous in quality to most manually classified examples. This technique of adding training data can be particularly helpful for critically small categories such as "weapons" or "alcohol and tobacco."

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
categorize a mobile application into at least one topical categorization, including by using contextual information associated with the mobile application;
extract a previously uncategorized Uniform Resource Locator (URL) from the mobile application, wherein extracting the previously uncategorized URL includes determining a set of URLs accessed by the mobile application when executed;
assign the topical categorization of the mobile application to the previously uncategorized URL extracted from the mobile application; and
generate as output the URL and its assigned categorization; and
a memory coupled to the processor and configured to provide the processor with instructions.

2. The system of claim 1 wherein extracting the previously uncategorized URL includes performing static analysis on the mobile application to identify embedded URLs.

3. The system of claim 1 wherein extracting the previously uncategorized URL includes performing dynamic analysis on the mobile application to identify dynamically generated URLs.

4. The system of claim 1 wherein the mobile application is categorized at least in part by matching a keyword list against words extracted from the mobile application during static analysis.

5. The system of claim 1 wherein using the contextual information to categorize the mobile application includes performing an analysis on a textual description of the mobile application obtained from a mobile application store.

6. The system of claim 1 wherein using the contextual information to categorize the mobile application includes performing an analysis of information associated with a developer of the mobile application, wherein the information is obtained from a mobile application store.

7. The system of claim 1 wherein using the contextual information to categorize the mobile application includes performing a categorization analysis of applications designated as similar to the mobile application in a mobile application store.

8. The system of claim 1 wherein assigning the category to the previously uncategorized URL includes assigning a severity level.

9. The system of claim 1 wherein the processor is further configured to include the previously uncategorized URL in a training set.

10. A method, comprising:
categorizing a mobile application into at least one topical categorization, including by using contextual information associated with the mobile application;
extracting a previously uncategorized Uniform Resource Locator (URL) from the mobile application, wherein extracting the previously uncategorized URL includes determining a set of URLs accessed by the mobile application when executed;
assigning the topical categorization of the mobile application to the previously uncategorized URL extracted from the mobile application; and
generating as output the URL and its assigned categorization.

11. The method of claim 10 wherein extracting the previously uncategorized URL includes performing static analysis on the mobile application to identify embedded URLs.

12. The method of claim 10 wherein extracting the previously uncategorized URL includes performing dynamic analysis on the mobile application to identify dynamically generated URLs.

13. The method of claim 10 wherein the mobile application is categorized at least in part by matching a keyword list against words extracted from the mobile application during static analysis.

14. The method of claim 10 wherein using the contextual information to categorize the mobile application includes performing an analysis on a textual description of the mobile application obtained from a mobile application store.

15. The method of claim 10 wherein using the contextual information to categorize the mobile application includes performing an analysis of information associated with a developer of the mobile application, wherein the information is obtained from a mobile application store.

16. The method of claim 10 wherein using the contextual information to categorize the mobile application includes performing a categorization analysis of applications designated as similar to the mobile application in a mobile application store.

17. The method of claim 10 wherein assigning the category to the previously uncategorized URL includes assigning a severity level.

18. The method of claim 10 further comprising including the previously uncategorized URL in a training set.

19. The system of claim 1 wherein using the categorization of the mobile application to assign the category to the previously uncategorized URL includes weighting features.

20. The method of claim 10 wherein using the categorization of the mobile application to assign the category to the previously uncategorized URL includes weighting features.

* * * * *